United States Patent [19]

Meyer

[11] 4,133,513
[45] Jan. 9, 1979

[54] BUTTERFLY VALVE ASSEMBLY

[75] Inventor: Paul L. Meyer, Louisville, Ky.

[73] Assignee: Celanese Corporation, New York, N.Y.

[21] Appl. No.: 735,299

[22] Filed: Oct. 26, 1976

[51] Int. Cl.² .................................... F16K 1/226
[52] U.S. Cl. ................................. 251/306; 251/368
[58] Field of Search .......... 251/306, 308, 305, 368, 251/307, 315; 137/375

[56] References Cited

U.S. PATENT DOCUMENTS

| | | | |
|---|---|---|---|
| 2,923,524 | 2/1960 | Fawkes | 251/306 |
| 2,986,373 | 5/1961 | Masheder | 251/305 |
| 3,024,802 | 3/1962 | Stillwagon | 251/306 |
| 3,072,139 | 1/1963 | Mosites | 251/306 |
| 3,471,121 | 10/1969 | Geiselman | 251/308 |
| 3,563,394 | 2/1971 | Smith | 251/306 |
| 3,595,523 | 7/1971 | Felton | 251/368 |
| 3,727,883 | 4/1973 | Conners et al. | 251/306 |
| 3,737,145 | 6/1973 | Heller et al. | 251/315 |
| 3,750,698 | 8/1973 | Walchle et al. | 251/305 |
| 3,778,028 | 12/1973 | Graves | 251/306 |
| 4,006,882 | 2/1977 | Bonafous | 251/306 |
| 4,025,050 | 5/1977 | Manki et al. | 251/306 |

Primary Examiner—William R. Cline
Assistant Examiner—H. Jay Spiegel

[57] ABSTRACT

A butterfly valve assembly includes a two-section housing in which a resilient liner is seated. The liner includes diagonally opposed collars, with a bushing being bonded within each collar. A gate is rotatably mounted within the liner and includes closure, stem and stub shaft portions of integral, one-piece construction. The gate is formed of plastic and includes a metallic reinforcing shaft extending completely therethrough. The closure includes bearing surfaces extending around the stem and stub shaft, and sealing surfaces extending between the bearing surfaces. The sealing and bearing surfaces are of continuous uninterrupted spherical configuration. The liner includes seating surfaces which extend between annular surfaces of each collar. The seating surfaces and the annular collar surfaces are of continuous uninterrupted spherical configuration. Flat surface portions are disposed on the bearing surfaces and extend around the stem and stub shaft portions. Flat ends of the bushings bear against these flat surfaces in sealing relationship. The stem includes a tapered section which extends between a pair of constant diameter sections to facilitate insertion of the gate within the liner. The liner includes annular flanges at its outer ends. Each flange includes a region of greatest thickness at its radial innermost portion so that when the valve assembly is installed within a flow line, compression of the flanges is concentrated at such region.

7 Claims, 6 Drawing Figures

BUTTERFLY VALVE ASSEMBLY

BACKGROUND AND OBJECTS

This invention relates to fluid control valves and, more particularly, to butterfly valves in which a gate is rotatably positioned within a resilient valve seat. Butterfly valves have traditionally included a casing with a central flow passage therethrough, and a gate rotatable therein for selectively opening and closing the flow passage, as exemplified in U.S. Reppert Pat. No. 2,876,984, issued Mar. 10, 1959; U.S. Stillwagon Pat. Nos. 2,912,218 and 2,994,342, issued Nov. 10, 1959 and Aug. 1, 1961, respectively; U.S. Cotterman et al. Pat. No. 3,173,650, issued Mar. 16, 1965; U.S. Black Pat. No. 3,338,551, issued Aug. 29, 1967; U.S. Hanssen Pat. No. 3,346,005, issued Oct. 10, 1967; and U.S. Naylor Pat. No. 3,904,173, issued Sept. 9, 1975. As these patents demonstrate, it is common to provide a valve seat formed of a liner of resilient material within the flow passage to improve the sealing function as well as to protect the casing from the corrosive influence of fluids being conducted.

Notwithstanding the use of such a liner, leakage problems are still present in many butterfly valves. For instance, fluid may have a tendency to seep along a stem portion of the valve or between the valve gate and the liner. The use of O-rings around the stem, or special bushings which are bonded to the liner and which embrace the stem have somewhat alleviated the problem of leakage along the stem, but room for improvement still remains.

As regards leakage between the gate and the liner, special configurations of these members have been proposed to minimize such leakage, but there remains the problem of providing an adequate seal without unduly hampering the installation of the gate into the liner.

As regards such installation, it is often necessary to deform the liner in order to enable insertion of one-piece gate elements therein. The liners are stiff enough to require substantial effort in order to properly install the gate. It would be desirable for such installation to be accomplished with less effort.

It is, therefore, an object of the present invention to minimize or obviate problems of the sort previously discussed.

It is another object of the present invention to provide a novel butterfly valve assembly.

It is further object of the invention to minimize leakage in butterfly valve assemblies.

It is yet another object of the invention to provide a novel butterfly valve assembly which establishes an effective seal and which may be easily assembled.

It is still another object of the present invention to facilitate the insertion of a one-piece gate into a flexible liner.

BRIEF SUMMARY OF A PREFERRED EMBODIMENT OF THE INVENTION

At least some of these objects are achieved by a butterfly valve assembly according to the present invention which includes a two-section housing in which a resilient liner is seated. The liner includes diagonally opposed collars, with a bushing being bonded within each collar and extending substantially completely therethrough. A gate is rotatably mounted within the liner and includes closure, stem and stub shaft portions of integral, one-piece construction. The gate is formed of plastic and includes a metallic reinforcing shaft extending completely therethrough.

The closure includes bearing surfaces extending around the stem and stub shaft, and sealing surfaces extending between the bearing surfaces. The sealing and bearing surfaces are of continuous uninterrupted spherical configuration. The liner includes seating surfaces which extend between annular surfaces of each collar. The seating surfaces and the annular collar surfaces are of continuous uninterrupted spherical configuration.

Flat surface portions are disposed on the bearing surfaces and extend around the stem and stub shaft portions. Flat ends of the bushings bear against these flat surfaces in sealing relationship.

The stem includes a tapered section which extends between a pair of constant diameter sections to facilitate insertion of the gate within the liner.

The liner includes annular flanges at its outer ends. Each flange includes a region of greatest thickness at its radial innermost portion so that when the valve assembly is installed within a flow line, compression of the flanges is concentrated at such region.

THE DRAWING

A preferred embodiment of the present invention is described in detail hereinafter in connection with the appended drawing in which.

DETAILED DESCRIPTION OF THE PREFERRED EMBODIMENT

A preferred butterfly valve assembly 1 according to the invention includes a housing 10, a resilient liner or boot 12 (FIG. 5) mounted within the housing, and a valving member 14 (FIG. 4) mounted within the liner.

Figure 3:
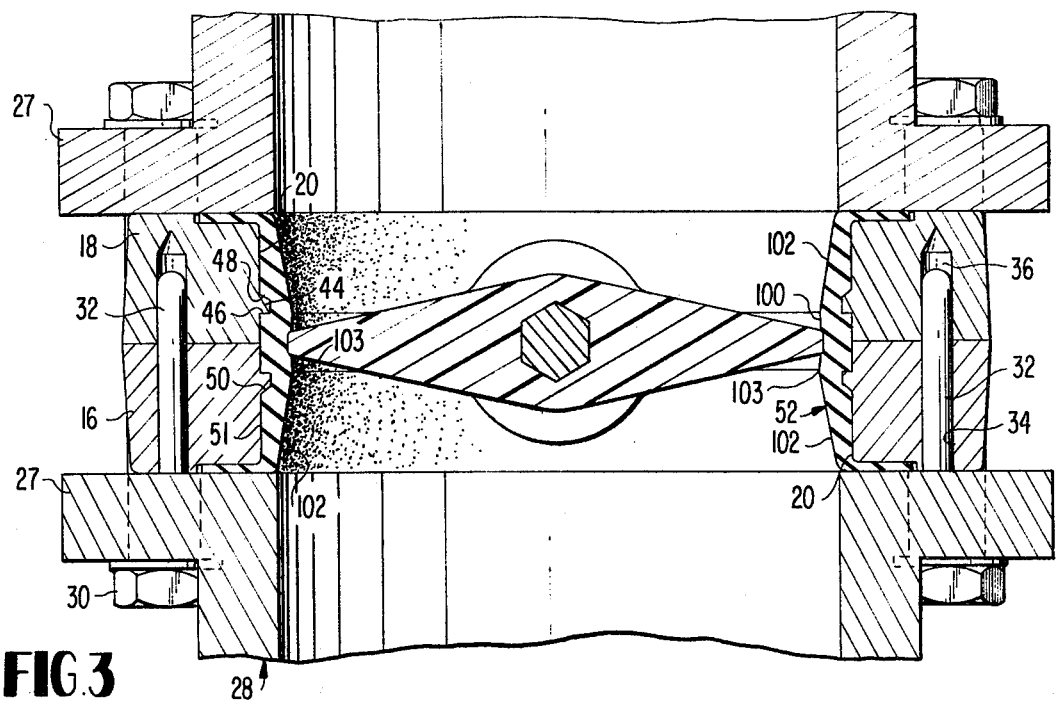
FIG. 3 is a cross-sectional view of the valve assembly, taken along line 3—3 of FIG. 2.

The housing 10 comprises a pair of plastic housing sections 16, 18. These housing sections 16, 18 each include an inner, generally cylindrical bore defining surface 20. When such surfaces 20 are aligned, they form a fluid flow passage through the valve. Alignment of these surfaces 20 is brought about by bringing the housing sections axially together so that inner end walls 24, 26 of the housing sections 16, 18 are in mutually facing and abutting relationship. The housing sections are thus joined along a plane which is perpendicular to the axis of the flow passage. The housing sections 16, 18 are to be installed between the flanges 27 of conventional pipe fittings 28. The valve assembly 1 is sandwiched between these flanges 27 so that end walls 29 of the housing sections 16, 18 engage the flanges 27. The flanges 27 and the valve assembly 1 are secured together by bolt-type fasteners 30. The housing sections are secured together by bolt type fasteners 32 which extend into aligned openings 34, 36 in the housing sections (FIG. 3). The housing sections are secured together prior to being inserted between the flanges 27.

Figure 2:
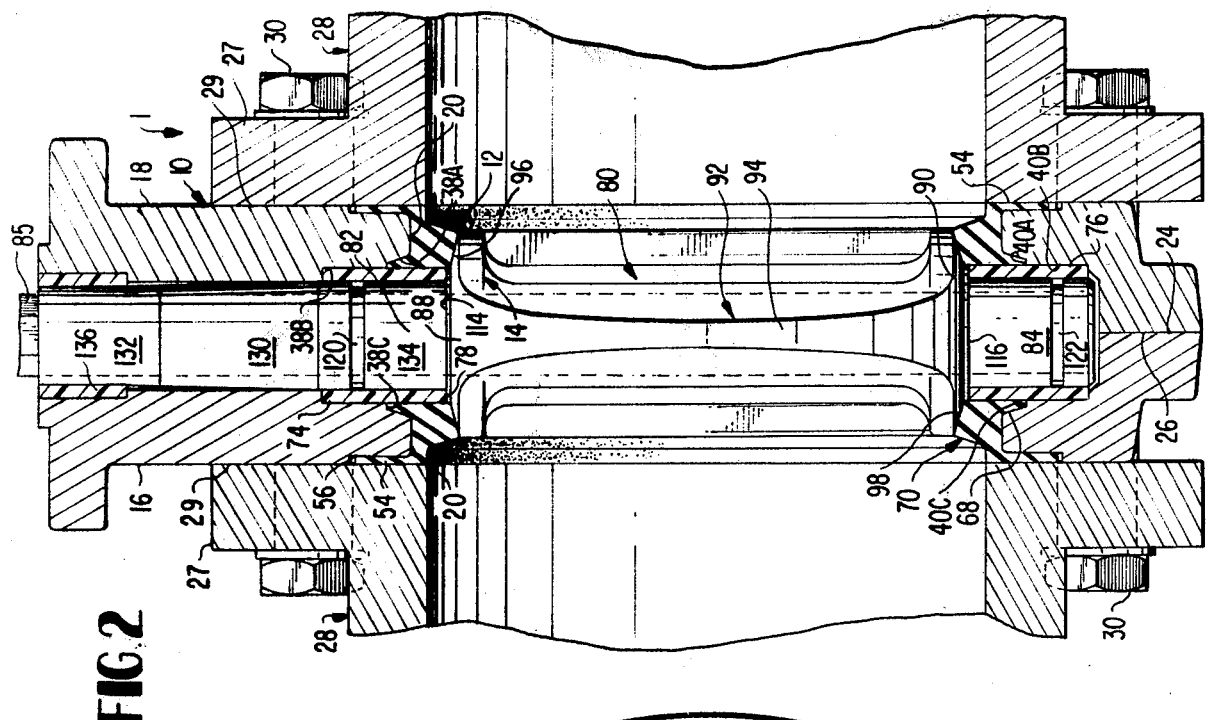
FIG. 2 is a cross section of the valve assembly taken along a longitudinal plane passing through the axis of the flow line, and depicting the valve in a closed condition.

The housing 10 includes a pair of diametrically opposed annular journal openings 38, 40 which are defined by semi-annular recesses in both housing sections 16, 18 when the housing sections are in abutting relationship (FIG. 2).

Each journal opening 38, 40 is axially stepped. That is, each opening includes inner and outer segments 38A, B; 40A, B that are spaced radially with respect to the flow axis. These segments are separated by a circumferential shoulder 38C, 40C. The outer segments 38B, 40B of the journal openings 38, 40 are of smaller diameter than the inner segments 38A, 40A. One of the journal openings 38 extends completely through the housing 10, to receive an operating portion of the valve stem, as will be discussed later, while the other journal opening 40 terminates within the housing.

The cylindrical surfaces 20 of the housing sections 16, 18 are configured to receive and retain the resilient liner 12. To this end, each of the surfaces 20 carries a pair of coplanar, circumferentially extending lugs 44 (FIG. 3) which project radially inwardly from an associated one of the surface 20. The lugs 44 of each pair extend circumferentially around the interior of the housing from one to the other of the journal openings 38, 40. Each lug includes a radially extending face 46 and an inclined face 48, which faces coverage in a radially inward direction. The lugs are received in correspondingly configured grooves 50 formed in an outer surface 51 of a generally cylindrical base portion 52 of the liner 12. There are two pairs of coplanar, axially spaced grooves 50 extending circumferentially around the outer periphery of the liner 12. Engagement between the lugs 44 and the sides of the grooves 50 serves to hold the liner 12 fixedly in place during actuation of the valving member 14.

Figure 6:
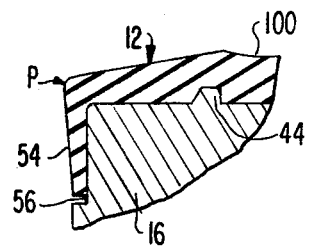
FIG. 6 is an enlarged fragmentary view of a flange portion of the liner mounted in a housing.

The liner 12 includes annular end flanges 54 joined at the axial ends of the base portion 52. These flanges 54 are received in annular, radially extending recesses 56 formed in the outer end walls 29 of the housing sections 16, 18 and are in surrounding relation to the flow passage (FIG. 3). The flanges 54, in their uncompressed condition prior to installation between the fittings 28, have a radially outwardly tapered configuration (FIG. 6). At the point P of maximum thickness, the flanges 54 have an axial dimension or thickness which is greater than the axial dimension, or thickness of the recesses 56. This assures that when the valve assembly is installed between the fitting flanges 27, maximum compressive engagement between the liner flanges 54 and the fittings 28 will occur at point P to intensify the sealing engagement therebetween. The recesses 56 have a radial dimension, or length, which is greater than the corresponding radial length of the uncompressed liner flanges 54 to accommodate radial expansion of the flanges 54 as they are compressed.

The tapered configuration of the flanges 54 serves to maximize the sealing effects by means of the localized, intensive compressive action occurring at the point P during installation of the valve assembly.

Extending through the base portion 52 of the liner 12 are a pair of diametrically opposed openings 60, 62. The openings are formed within diametrically opposed annular collars 64, 66 which are integral with the base portion 52. Each of the collars includes an outer neck portion 68 extending radially beyond the outer surface 51 of the base portion 52, and an inner neck portion 70 extending radially inwardly of an inner surface 72 of the base portion 52.

The outer neck portion 68 of the collar 66 is received within the journal opening 40, and the outer neck portion 68 of the collar 64 is received within the journal opening 38.

Figure 1:
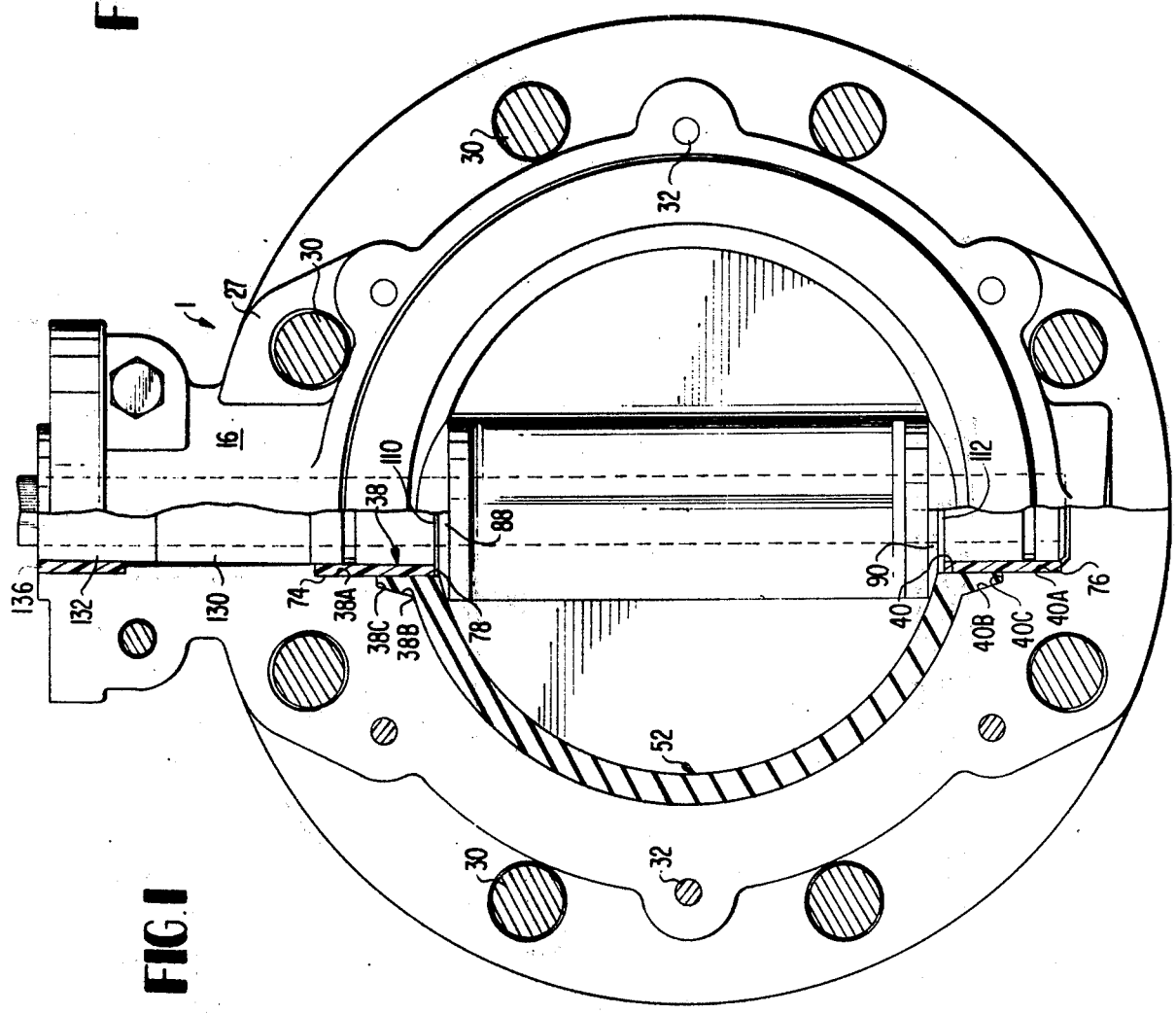
FIG. 1 is an end view of a valve assembly in an open condition according to the present invention, with a portion thereof broken away to reveal inner portions thereof.

Carried by the collars 64, 66 are a pair of cylindrical bushings 74, 76, preferably formed of Teflon or the like. These bushings serve to rotatably receive stem portions of the gate 14, as will be later discussed. The bushings 74, 76 are permanently bonded to the collars 64, 66. That is, the bushings are preferably inserted into a mold in which the liner is formed. When the liner material, preferably rubber, is poured and hardened, it adheres to the bushings. Consequently, there is formed an integral liner-bushing assembly, with portions of the bushing outer surfaces being bonded to the inner surfaces of the collars. As is apparent from FIGS. 1 and 2, the bushings 74, 76 extend along substantially the entire length of the collars 64, 66. It is preferred that the inner ends 78 of the bushings terminate just slightly short of the inner ends of the collars for reasons to be discussed later. The bushings 74, 76 and the collars 64, 66 are received within the journal openings 38, 40. The outermost ends of the collars abut against the shoulders 38C, 40C of the journal openings 38, 40, and the bushings 74, 76 project into the outer portions 38B, 40B of the journal openings.

The bushings 74, 76 serve to rotatably mount the gate 14. The gate includes a closure 80, a stem 82 and a stub shaft 84 which are of integral, one-piece molded construction, preferably of a hard plastic material. The gate 14 is hollow, having an opening extending completely therethrough, which opening receives a steel reinforcing shaft 85. The reinforcing shaft is preferably of polygonal cross section, such as hexagonal, to prevent relative rotation between the reinforcing shaft and the integral closure, stem and stub shaft. The stem terminates at an outer edge of the housing, while the reinforcing shaft 85 projects beyond the end of the stem 82 to receive a control handle for manual actuation of the gate.

The closure 80 is in the form of a spherical segment. That is, the closure, although of molded construction integral with the stem 82 and the stub shaft 84, can be envisioned as comprising a sphere with portions of the sides cut away. The closure 80 thus includes opposed bearing portions 86, 87 having bearing surfaces 88, 90 of spherical configuration. These surfaces 88, 90 are interconnected by the outer surfaces 94 of wing portions 92 of the closure, which wing surfaces 94 are also of spherical configuration. These outer surfaces 94 of the wing portions 92 define spherically configured seating surfaces which engage the liner 12.

The bearing surfaces 88, 90 sealingly engage corresponding spherical surfaces 96, 98 of the collars 64, 66. During rotation of the gate 14, the surfaces 88, 90 and 96, 98 of the gate and liner are in continuous sealing engagement.

The inner side 72 of the base portion 52 of the liner 12 includes annular seating surfaces 100 extending circumferentially from one collar to the other (FIG. 3). The seating surfaces 100 are disposed midway between the axial ends of the liner and are bordered by a pair of frustoconical surfaces 102 which flare outwardly in axially and radially outward directions. The seating surfaces 100 each comprises a segment of a sphere whose center corresponds substantially to that of the gate 80, i.e., at the intersection of the flow axis and the axis of the stem 82. The uncompressed radius of curvature of the seating surfaces 100 can be made slightly less than that of the sealing surfaces 94 in order to provide for a slight compression of the seating surfaces 100 by the sealing surfaces 94, upon closing the flow lines. This assures a tight seal.

The arrangement of the seating and sealing surfaces 100, 94 provides for an essentially uniform degree of compression of the sealing surfaces 100 as the flow line is being closed. As the gate is rotated toward a closed position, contact of the sealing surfaces 94 with the seating surfaces 100 begins at the end edges 103 of the seating surfaces. Thereupon, the seating surfaces 100 are slightly compressed by the sealing surfaces 94. During the continued rotation of the gate, the degree of compression of the seating surfaces 100 is constant. Therefore, the gate does not have to be rotated to a position where the plane of the wing portions 92 lies at right angles to the flow passage to create a proper seal. That is, the sealing surfaces 94 can be disposed slightly to either side of the central plane of the seating surfaces 100 while still providing an effective seal. The degree of compression of the seating surfaces 100 will be essentially the same no matter where along their periphery they are contacted by the sealing surfaces 94.

Figure 4:
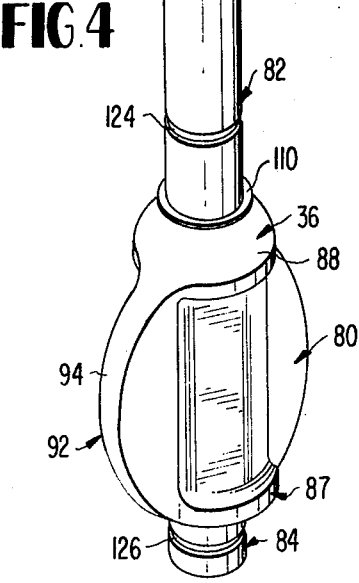
FIG. 4 is a perspective view of a gate element of the valve assembly according to the present invention.
Figure 5:
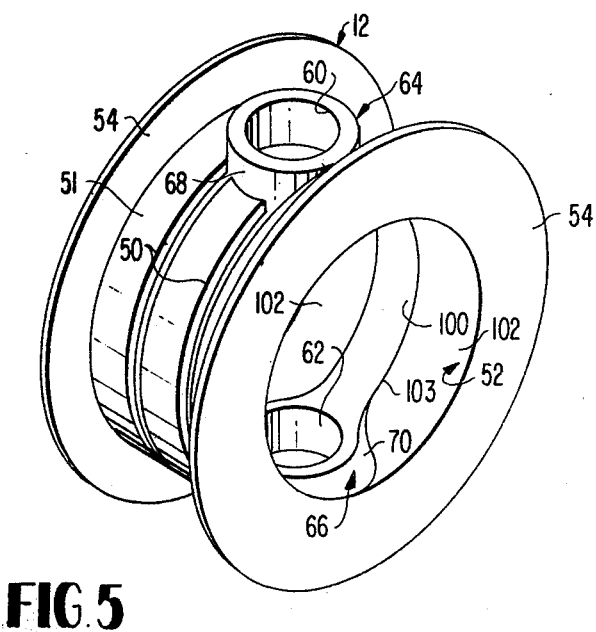
FIG. 5 is a perspective view of a liner element of the valve assembly according to the present invention.

The wings 92 are configured so that the sealing surfaces 94 each progressively diminish in width from the bearing surfaces 88, 90 to the radially innermost points P of the sealing surfaces, i.e., the points defined by imaginary lines extending parallel to the rotary axis of the gate and tangentially to the sealing surfaces (FIG. 4). It will be realized that the bearing surfaces 88, 90, together with the sealing surfaces 94, define a continuous, spherically configured face which is operable to bear against a continuous, spherically configured face defined by the sealing surfaces 94 and the collar surfaces 96, 98. The bearing surfaces 88, 90 are in continuous nesting contact with the collar surfaces 96, 98, whereas the sealing surfaces 94 engage the seating surfaces 100 only when the gate is rotated to a flow blocking position.

It will thus be realized that when the gate 14 is rotated to a closed position (FIG. 3), the seal which is established between the wings 92 and the liner 12 and between the bearing portions 88, 90 and the liner is spherical and extends circumferentially around the flow passage and around the common axis of the stem 82 and stub shaft 84, right up to the inner ends of the bushings 74, 76. In this fashion, the seal is continuous and involves no sharp angles which could be detrimental to the sealing action or which will cause substantial wear in response to repeated actuation of the gate.

The sealing relationship between the bushings 76, 78 and the stems 82 and stub shaft 84 resist the leakage of fluid therebetween. Significantly, this sealing relationship extends radially inwardly to the bearing portions 86, 87 of the gate. To facilitate this seal, cylindrical shoulder portions 110, 112 project outwardly from the bearing surfaces 88, 90. These shoulder portions 110, 112 are integral with the bearing portions 86, 87 and present substantially flat radially outwardly facing annular surfaces 114, 116 against which surfaces the flat ends 78 of the cylindrical bushings 74, 76 bear.

To provide further sealing action for the stem and the stub shaft, resilient O-rings 120, 122 are positioned within grooves 124, 126 of the stem and the stub shaft, respectively. These grooves 124, 126 are disposed within the axial limits of the bushings 74, 76 so that the O-rings bear against the inner surfaces of the bushings.

The stem 82 includes an inwardly tapering portion 130 extending between a small diameter stem portion 132 and a large diameter stem portion 134. Each stem portion 132, 134 is of substantially constant diameter. The stem portion 132 is mounted within a bushing 136 at an outer end of the housing 10, and the stem portion 134 is mounted within the bushing 74. Tapering of the stem at 130 facilitates manual installation of the gate 14 into the liner 12 during assembly of the valve. That is, the valve assembly is assembled by initially installing the gate 14 within the liner 12 so that the stem 82 extends through the collar 64 and the stub shaft 84 extends through the collar 66. This entails resilient flexing and deforming of the liner 12 so that first the stem and then the stub shaft can be properly inserted. It has been found that by tapering the stem 82, insertion of the stem through the collar 66 and the bushing 74 is greatly facilitated. That is, the liner 12 does not require as much bending and twisting effort in order to receive the stem 82. Although the liner 12 is formed of flexible material, it is sufficiently stiff to require substantial effort to be deformed.

Removal of the gate is facilitated in a similar manner.

In operation, the valve is assembled by installing the gate 14 into the liner 12. This is achieved with considerably less effort due to the non-uniform diameter of the stem 82 of the gate. That is, the small diameter portion 132 and the tapered portion 130 of the stem enable the stem to be inserted through the collar 64 and the bearing 74 with considerably less deformation of the liner. Ample support for the gate is provided, however, by the larger diameter portion 134 which is rotatably mounted within the bearing 74. Thereafter, the liner is again deformed and the stub shaft 84 is inserted through the collar 66 and the bearing 76.

Subsequently, the bearing 136 is installed around the small diameter portion 132 of the shaft and the housing sections 16, 18 are installed around the gate/liner unit. This is accomplished by again deforming the liner at the flanges 54 so that the housing sections can be axially inserted over the liner, with the annular lugs 44 being received within the annular grooves 50.

Installation of the fittings 28 around the valve assembly can be effected by securing the bolts 30. In so doing, the fitting flanges 28 bear against and compress the liner flanges 54. Compaction is concentrated at the thickened points P of the liner flanges 54 to maximize the sealing action.

In this condition, the valve assembly 1 is suitable for being installed in a flow line in a conventional manner. A handle is connected to the outermost end of the reinforcing shaft 85 to facilitate rotation of the gate 14.

When the gate is rotated to a closed position, the spherical sealing surfaces 94 sealingly engage the spherical seating surfaces 100 to block fluid flow. A complete seal is effected around the flow passage by virtue of the continuous and uninterrupted spherical sealing surfaces defined by the sealing surfaces 94 and the bearing surfaces 88, 90 on the one hand, and the seating surfaces 100 and the collar surfaces 96, 98. An effective seal along the stem and stub shafts 82, 84 is achieved by the bearings 74, 76 which extend completely through the collars 64, 66 and contact the bearing surfaces at 114, 116.

Ample reinforcement of the plastic gate is provided by the metallic reinforcing shaft 85 to which can be mounted a control handle to accommodate rotation of the gate.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A butterfly valve assembly of the type to be connected within a flow line, comprising:
   a two-section housing, the sections of which being separatable in the axial direction of a flow passage through the housing;
   a resilient liner seated within the housing and around the flow passage, said liner including:
   diametrically opposed annular openings;
   annular surfaces surrounding said openings; and
   circumferentially disposed seating surfaces extending from one annular surface to the other;
   a pair of cylindrical bushings bonded within said openings, each bushing having a flat inner end; and
   a gate including closure, stem, and stub shaft portions;
   said stem and stub shaft portions extending through respective ones of said bushings;
   said closure portion including opposed wing elements and opposed bearing elements;
   said bearing elements including annular bearing surfaces surrounding said stem portion and said stub shaft portion and bearing against said annular surfaces surrounding said openings in said liner;
   said wing elements including sealing surfaces extending between said bearing surfaces operable to bear against said seating surfaces of said liner;
   said sealing surfaces and said bearing surfaces being of continuous and uninterrupted spherical configuration;
   said seating surfaces and said annular surfaces surrounding said openings being of continuous and uninterrupted spherical configuration whose center of curvature corresponds substantially to that of said spherical sealing and bearing surfaces; and
   generally cylindrical shoulder portions extending outwardly from said spherical bearing surfaces and into said openings of said liner, said shoulder portions terminating in flat surface portions which encircle said stem and stub shaft portions and bear against said flat ends of said bushings.

2. Apparatus according to claim 1 wherein said flat surfaces of said bearing surfaces are defined by generally cylindrical lip portions extending outwardly therefrom.

3. Apparatus according to claim 1 wherein said stem portion comprises a first section rotatably mounted in a first of said bushings and being of substantially constant diameter, a second section rotatably mounted in a third bushing in said housing located outwardly of said first section, said second section having substantially constant diameter which is smaller than that of said first section, and a tapered section extending between said first and second sections.

4. Apparatus according to claim 1 wherein said liner includes annular, radially extending flanges at its axial ends, said flanges being received in recesses in said housing sections and being operable to be compressed between pipe fittings where said valve assembly is mounted within a flow line; the thickness of each of said flanges gradually diminishing in a radially outward direction, the region of greatest thickness of each flange being located substantially at the radial innermost portion thereof and being greater than the depth of said recess at that point, so that when pipe fittings are pressed against said housing sections, compression of said flanges is concentrated at said points of greatest thickness.

5. Apparatus according to claim 1 wherein said gate is formed of plastic material and includes a metallic reinforcing shaft extending through said stem, stub shaft and closure portions.

6. Apparatus according to claim 5 wherein said stem terminates at an outer edge of said housing; said reinforcing shaft being of polygonal cross section and extending beyond said housing for connection with a control handle.

7. A butterfly valve assembly, of the type to be connected within a flow line, comprising:
   a housing including first and second housing sections, said housing sections including aligned bores defining a flow passage axially therethrough and said housing sections being axially separable, each housing section comprising:
   first and second diametrically opposed recesses disposed such that when said housing sections are in abutting relationship, said first and second recesses define alinged, radially extending journal openings communicating with said flow passage;
   said journal openings each including a first annular portion and a second annular portion, said second annular portion disposed radially outwardly of said first annular portion and being of smaller diameter than said first annular portion; and
   a radially inwardly projecting lug extending circumferentially around said flow passage from one journal opening to the other;
   a liner formed of flexible resilient material and mounted in said housing, said liner including a base portion and flange portions disposed at axial ends thereof, said base portion comprising:
   a pair of diametrically opposed collars having openings therethrough aligned with said journal openings, said collars being received in said first portions of said journal openings;
   each collar including a radially inwardly facing annular surface surrounding the opening therethrough;
   two pairs of axially spaced, radially outwardly open, annular grooves extending circumferentially around the outer periphery of said base portion from one collar to the other;
   said annular grooves receiving said annular lugs of said housing sections;
   a pair of seating surfaces extending circumferentially around the inner periphery of said base portion from one collar to the other, said seating surfaces being located intermediate said flange portions;
   said seating surfaces and said annular surfaces surrounding said collars being of spherical configuration;

said flange portions being tapered, and narrowing in a direction outwardly from the axial outer ends of said base portion and being received in said annular recesses in said end walls of said housing sections, the greatest thickness of said flanges being larger than the depth of said annular recesses so as to project outwardly thereof in an uncompressed state;

a pair of bushings bonded within said collars;

said bushings being received in said annular portions of said journal openings; and a gate rotatably mounted in said housing, said gate comprising integral one-piece closure, stem and stub shaft portions formed of hard plastic material, and a metallic reinforcing shaft extending longitudinally completely therethrough;

said stem and stub shaft portions being aligned and rotatably received in said bushings, said stem and stub shaft portions each carrying a sealing ring which sealingly engages its associated bushing;

said stem being rotatable to move said disc portion between passage-opening and passage-closing positions;

said closure portion including diametrically opposed wing portions and diametrically opposed bearing portions;

said bearing portions each including a bearing surface in engagement with a respective one of said annular surfaces of said collars;

said wing portions each including an outer peripheral sealing edge surface extending from one bearing surface to the other, said sealing surfaces being engageable with said sealing surfaces of said liner;

said sealing surfaces and said bearing surfaces being continuous and of spherical configuration whose center of curvature is essentially co-extensive with the center of curvature of said sealing surfaces and said annular surfaces;

said bearing portions each having a substantially cylindrical lip extending radially outwardly from said bearing surfaces, the ends of said bushings being seated against flat ends of said lips;

said stem including a first section of substantially constant diameter rotatably mounted in one of said bushings, a second section rotatably mounted in a third bushing in said housing located outwardly of said first section, said second section being of substantially constant diameter smaller than that of said first section; and a tapered section extending between said first and second sections.

* * * * *